United States Patent
Kozko et al.

(10) Patent No.: US 9,392,155 B1
(45) Date of Patent: Jul. 12, 2016

(54) USE OF NON-REFLECTIVE SEPARATOR BETWEEN LENSES STRIKING A SINGLE OPTICAL SENSOR TO REDUCE PERIPHERAL INTERFERENCE

(71) Applicant: IC REAL TECH, INC., Pompano Beach, FL (US)

(72) Inventors: Dmitry Kozko, Aventura, FL (US); Ivan Onuchin, Hollywood, FL (US)

( * ) Notice: Subject to any disclaimer, the term of this patent is extended or adjusted under 35 U.S.C. 154(b) by 0 days.

(21) Appl. No.: 14/860,859

(22) Filed: Sep. 22, 2015

Related U.S. Application Data

(60) Provisional application No. 62/195,494, filed on Jul. 22, 2015.

(51) Int. Cl.
 H04N 9/07 (2006.01)
 H04N 5/225 (2006.01)
 H04N 9/04 (2006.01)
 H04N 9/09 (2006.01)
 H04N 9/097 (2006.01)
 G02B 27/14 (2006.01)

(52) U.S. Cl.
 CPC ............ H04N 5/2254 (2013.01); G02B 27/145 (2013.01); H04N 9/045 (2013.01); H04N 9/09 (2013.01); H04N 9/097 (2013.01)

(58) Field of Classification Search
 CPC . H04N 5/2254; H04N 5/232; H04N 5/23238; H04N 9/045; H04N 9/09; H04N 9/097; G02B 27/145
 See application file for complete search history.

(56) References Cited

U.S. PATENT DOCUMENTS

| | | | | |
|---|---|---|---|---|
| 2004/0061799 A1* | 4/2004 | Atarashi | ................ | G02B 7/022 348/340 |
| 2004/0240052 A1* | 12/2004 | Minefuji | ............ | G02B 13/0015 359/435 |
| 2009/0122175 A1* | 5/2009 | Yamagata | ............ | G02B 3/0043 348/335 |
| 2010/0060775 A1* | 3/2010 | Shintani | ............... | H04N 5/2252 348/335 |
| 2010/0277629 A1* | 11/2010 | Tanaka | ................. | H04N 5/2254 348/280 |
| 2011/0038065 A1* | 2/2011 | Miyawaki | .............. | G02B 7/021 359/819 |
| 2012/0236412 A1* | 9/2012 | Urakami | ................ | G03B 11/00 359/507 |
| 2013/0258044 A1* | 10/2013 | Betts-Lacroix | .... | H04N 13/0242 348/36 |

* cited by examiner

*Primary Examiner* — Aung S Moe
*Assistant Examiner* — John H Morehead, III
(74) *Attorney, Agent, or Firm* — Patents on Demand P.A.; Brian K. Buchheit; Scott M. Garrett

(57) ABSTRACT

A rectangular image sensor can be present within an optical capture device. Two lenses that capture and direct light from a real world environment upon the image sensor. The image sensor can be a device which converts the light from the real world environment into electronic signals. A non-reflective separator can be positioned between the optical pathways of light from the two lenses. The separator can absorb light from a region surrounding the image circle to prevent optical distortions from the image circles which are in close proximity to each other.

14 Claims, 4 Drawing Sheets

USE OF NON-REFLECTIVE SEPARATOR BETWEEN LENSES STRIKING A SINGLE OPTICAL SENSOR TO REDUCE PERIPHERAL INTERFERENCE

CROSS REFERENCE TO RELATED APPLICATION

This application claims the benefit of Provisional Application No. 62/195,494, filed Jul. 22, 2015, entitled "Use of Non-Reflective Blinder Between Lenses Striking a Single Optical Sensor to Reduce Peripheral Interference". Provisional Application No. 62/195,494 is incorporated herein in its entirety.

BACKGROUND

The present invention relates to the field of multi-lens optical capture devices and, more particularly, to use of a non-reflective separator between lenses striking a single optical sensor to reduce peripheral interference.

Commercial image sensors are generally rectangular shaped due to fabrication techniques and constraints. During fabrication a relatively large rectangular surface is formed, which is subdivided into smaller rectangular geometries, each of which become an image sensor. Conventionally, a rectangular or square sensor is used as a light target for a circular (or oval) image circle from a lens. As such, there is an incongruity between the image circle from the lens (e.g., light striking image sensor) and the geometry of the sensor (e.g., rectangular). Consequently, maximizing image sensor usage has been a significant effort within the industry.

BRIEF SUMMARY

One aspect of the present invention can include an optical capture device with a non-reflective separator between lenses striking a single optical sensor to reduce peripheral interference. A rectangular image sensor can be present within an optical capture device. Two lenses that capture and direct light from a real world environment upon the image sensor. The image sensor can be a device which converts the light from the real world environment into electronic signals. A non-reflective separator can be positioned between the optical pathways of light from the two lenses. The separator can absorb light from a region surrounding the image circle to prevent optical distortions from the image circles which are in close proximity to each other.

Another aspect of the present invention can include a camera module for with a non-reflective separator between lenses striking a single optical sensor to reduce peripheral interference. A rectangular image sensor can be present within an optical capture device. Two lenses within the optical capture device can capture and direct light upon a rectangular image sensor of the optical capture device concurrently. The light from the two lenses can strike the rectangular image sensor in non-overlapping areas simultaneously. The image sensor can be a device which converts light within the real world environment into electronic signals. A non-reflective non-transparent separator can be positioned between the optical pathways of light from the two lenses. The separator can absorb light from a region surrounding the image circle to prevent optical distortions from the image circles which are in close proximity to each other.

Yet another aspect of the present invention can include a system for a non-reflective separator between lenses striking a single optical sensor to reduce peripheral interference. A non-reflective separator can be positioned between the optical pathways of light from two opposing lenses within a multi-lens camera. The separator can absorb peripheral light interference from a region surrounding an image circle produced by the optical pathways of light onto an image sensor. The separator can prevent optical distortions from the image circles which are in close proximity to each other.

DETAILED DESCRIPTION

The present disclosure is a solution for use of a non-reflective separator between lenses striking a single optical sensor to reduce peripheral interference. In the solution, light collected by a set of lenses can be captured onto a singular image sensor. That is, a single image sensor (e.g., rectangular in shape) can receive light from different lenses concurrently. These lenses can face opposite directions or otherwise contain image data that is non-overlapping. The areas of the image sensor upon which an image circle from each of the two lenses is non-overlapping, as well. In one embodiment, a non-reflective, non-transparent separator can be positioned between the image circles (e.g., perpendicular to the image sensor) to reduce peripheral interference from the adjacent circle. For example, the separator can be a rectangular blinder positioned normal to the sensor and can be aligned along the perpendicular to the length of the sensor.

Figure 1A:
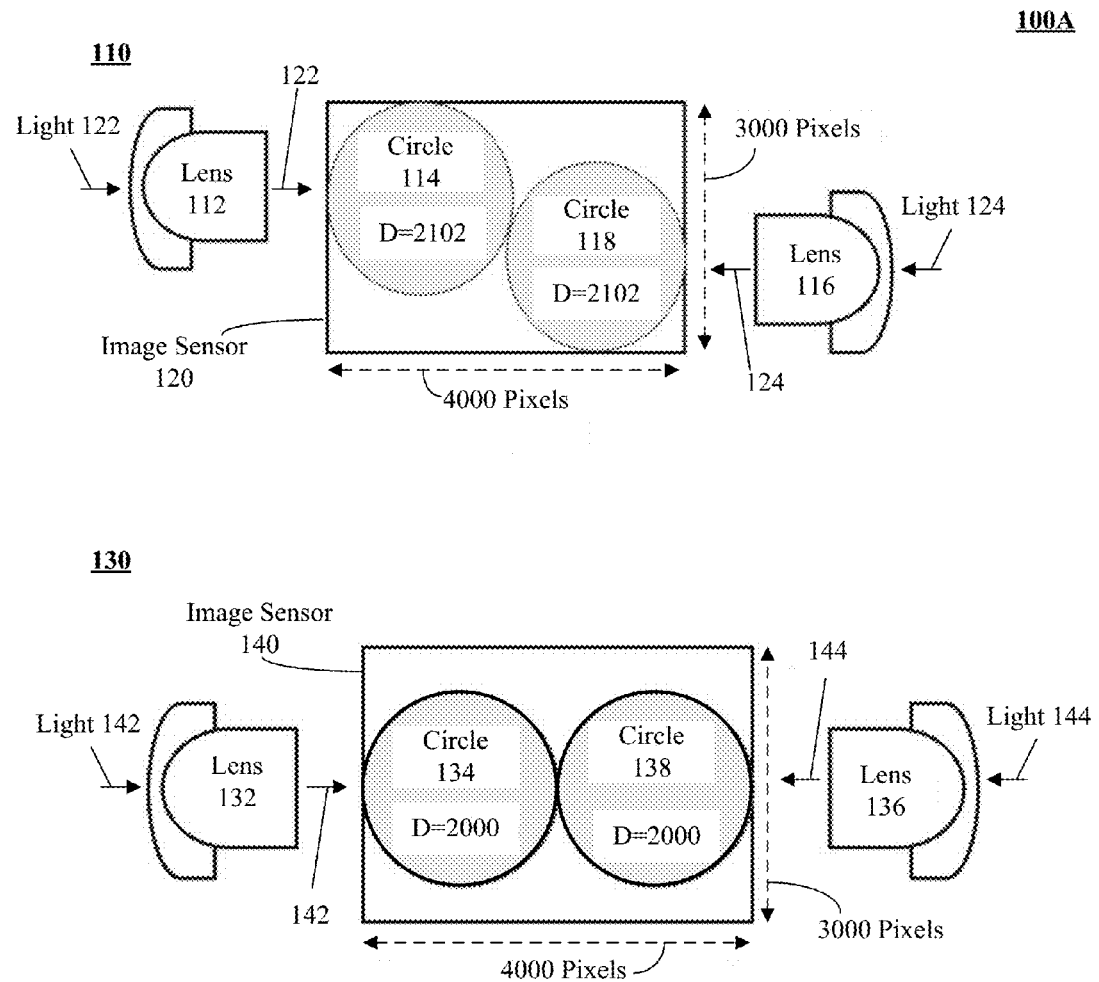
FIG. 1A is a schematic diagram illustrating a set of embodiments for use of a non-reflective separator between lenses striking a single optical sensor to reduce peripheral interference in accordance with an embodiment of the inventive arrangements disclosed herein.

FIG. 1A is a schematic diagram illustrating a set of embodiments 110, 130 for use of a non-reflective separator between lenses striking a single optical sensor to reduce peripheral interference in accordance with an embodiment of the inventive arrangements disclosed herein. Embodiments 110, 130 can be performed in the context of embodiments 150, 170, 210, 250, 310, 330, 340, 350, and/or system 370.

An image sensor 120 (e.g., imaging sensor) is a sensor that detects and conveys the information that constitutes an image. The sensor 120 can convert the variable attenuation of waves (e.g., as they pass through or reflect off objects) into signals, the small bursts of current that convey the information. The waves can be light 122, 124 or other electromagnetic radiation. Digital image sensors can include semiconductor charge-coupled devices (CCD) or active pixel sensors in complementary metal-oxide-semiconductor (CMOS) or N-type metal-oxide-semiconductor (NMOS, Live MOS) technologies.

Embodiment 110, 130 utilizes a single image sensor 120, 140 (e.g., rectangular in shape) for two different lenses (e.g., 112, 116 for embodiment 110 and 132, 136 for embodiment 130). These lenses 112, 116, 132, 1346 can face opposing directions (e.g., or otherwise contain image data that is non-overlapping). The areas of the image sensor upon which an image circle 114, 118, 134, 138 can be formed from the light 122, 124 from each of the two lenses 112, 116, 132, 136 is non-overlapping, as well. For example, two images 114, 118 can be formed on a single image sensor 120 from two different opposing lenses 112, 116 of a multi-lens camera.

One challenge faced with the embodiment 110, 130 is to make the image circles 114, 118, 134, 138 as close as possible to each other (e.g., to maximize effective space of an image sensor being used), while ensuring that the image circles 114, 118, 134, 138 are non-overlapping.

Figure 1B:
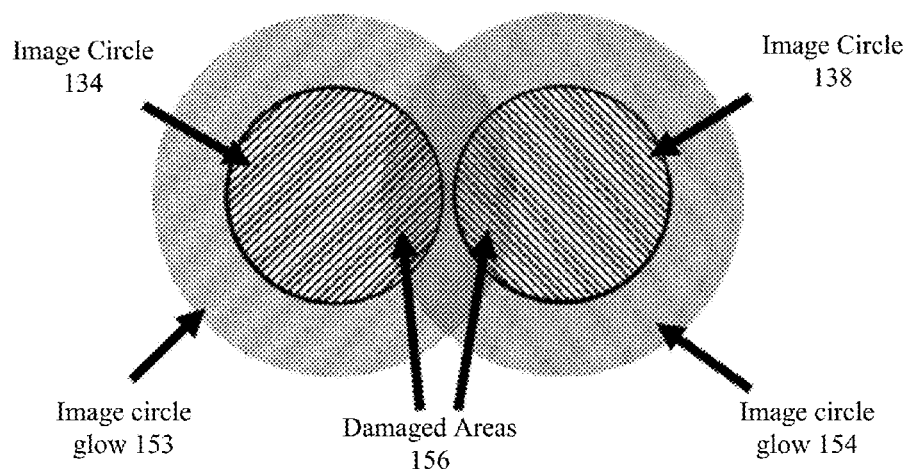
FIG. 1B is a schematic diagram illustrating a set of embodiments for isolating opposing lenses from each other for an assembly that produces concurrent non-overlapping image circles on a common image sensor in accordance with an embodiment of the inventive arrangements disclosed herein.
Figure 1B:
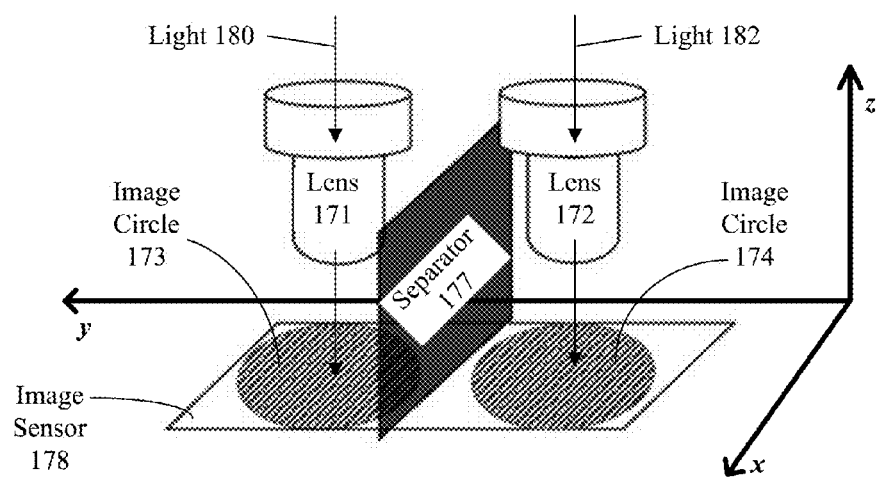

FIG. 1B is a schematic diagram illustrating a set of embodiments 150, 170 for isolating opposing lenses from each other for an assembly that produces concurrent non-overlapping image circles on a common image sensor in accordance with an embodiment of the inventive arrangements disclosed herein. Embodiments 150, 170 can be performed in the context of embodiments 110, 130, 210, 250, 310, 330, 340, 350, and/or system 370.

Embodiment 150 illustrates a penumbral 'glow' associated with image circle 134, 138 as a result of image capture. That is, while image circles 134, 138 are discrete, the circles 134, 136 light from lens 142, 144 is not completely occluded, thus a penumbral shadow 153, 154 is formed. That is, image circle 134, 138 have a glow as a result of optical scatter around an image circle. When the image circles are positioned close to each other, the glow 153 of circle 134 can overlap the area of the other's image circle 138 and vice versa. This results in an optical interference that is visually shown in embodiment 150. The region of interference is listed as damaged areas 156 as the optical content is distorted within this region.

To prevent damaged areas 156 the image circles can be isolated from each other to minimize the distractive interference resulting from the respective glow about the image circles. A simplistic example of this is shown in embodiment 170. In embodiment 170, the region that would be close to the overlap, utilizes a non-reflective separator to absorb the 'glow'. Thus, the light 180, 182 from the two lenses 171, 172 striking the image sensor 178 surface lacks the glow (or has been minimized) to ensure that an area of the image circle 173, 174 is not corrupted by the glow of the neighboring image circle.

As used herein, separator 177 can be a physical intermediary object which can be positioned between the edges of two or more image circles to reduce or eliminate peripheral light interference emanating from the edge of an image circle. Peripheral light interference can be light associated with an image circle which can reduce the fidelity of an adjacent image circle. Light can be a portion of an electromagnetic spectrum existing with a real world environment. Light can include, but is not limited to, visible light, non-visible light, and the like.

Separator 177 geometry can be arbitrarily defined in context of optical device limitations and/or specifics. In one embodiment, separator 177 can be a rectangular solid with a 25.4 millimeter width, one and a 12.7 millimeter length, and a 2 millimeter thickness. In one embodiment, separator 177 can be proximate to sensor 178, can contact the sensor 178, and the like. In one instance, separator 177 can include a non-abrasive base which can be safely positioned against the sensor 178 when the sensor and separator 177 are in contact.

In one embodiment, separator 177 can include multiple layers which can absorb different wavelengths of light. In the embodiment, separator 177 can utilize traditional and/or proprietary light blocking mechanisms to effectively reduce or eliminate peripheral interference. For example, separator 177 can include three layers which can absorb red, green, and blue components of visible light.

Drawings presented herein are for illustrative purposes only and should not be construed to limit the invention in any regard. It should be appreciated that embodiment 170 can illustrate an image sensor 178 oriented within a three dimensional Euclidian space. In one instance, the sensor 178 can lie horizontally (e.g., along an x and y axis) and a separator 177 can be positioned vertically (e.g., along the z axis). In the instance, separator 177 can be utilized to separate light 180, 182 from optical pathways associated with lens 171, 172.

Figure 2:
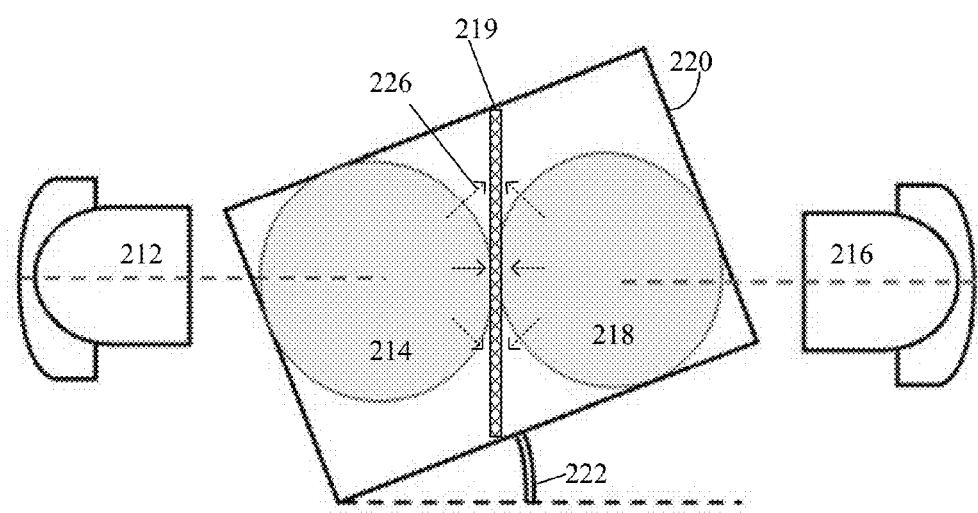
FIG. 2 is a schematic diagram illustrating a set of embodiments for use of a non-reflective separator between lenses striking a single optical sensor to reduce peripheral interference in accordance with an embodiment of the inventive arrangements disclosed herein.
Figure 2:
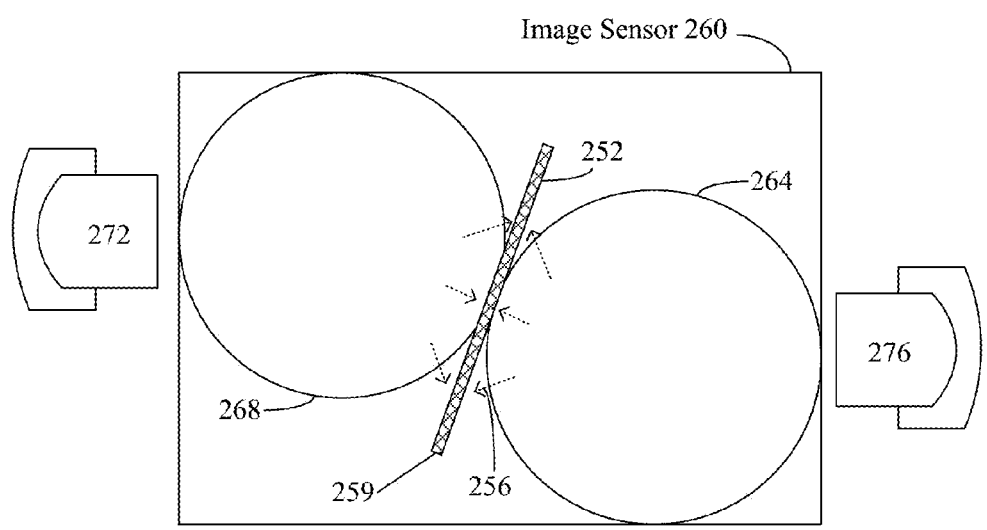

FIG. 2 is a schematic diagram illustrating a set of embodiments 210, 250 for use of a non-reflective separator between lenses striking a single optical sensor to reduce peripheral interference in accordance with an embodiment of the inventive arrangements disclosed herein. Embodiments 210, 230 can be performed in the context of embodiments 110, 130, 150, 170, 310, 330, 340, 350, and/or system 370.

The embodiments 210, 230 can utilize a lens arrangement with opposing lenses, each directing their captured optics. The light from lenses 212, 16, 272, 276 can be directed to the image sensor as image circles 214, 218, 264, 268. The light 226, 256 emanating from the edges of the circles 214, 218, 264, 268 can be absorbed a non-reflective non-transparent separator 219 to ensure optical interfere between image circles is minimized.

Embodiments 230, 250 illustrate two different exemplary arrangements for a separator 219, 259, where the optical properties (e.g., length from lens to image sensor, image circle size) of the embodiments can be similar.

In embodiment 230, lenses 212, 214 can be arranged along an arbitrary angle 222 to the image sensor. For example, lenses 212, 214 can be oriented at 45 degrees offset from the image sensor. In the embodiment, separator 219 can be parallel the lens position and extend along the entire width of the sensor 220.

In embodiment 250, lenses 272, 276 can produce two image circles 268, 264 on sensor 260. In the embodiment, a separator 259 can obstruct light 256 emanating from the edges of image circles 24, 268. In one instance, the separator 259 can extend a portion of the sensor. For example, separator 259 width can be approximately equivalent to the diameter of the image circles 264, 268.

Drawings presented herein are for illustrative purposes only and should not be construed to limit the invention in any regard. In one instance, separator 219, 259 can be adjusted (e.g., manually) to improve peripheral interference efficacy and/or optimize image circle size/position.

Figure 3:
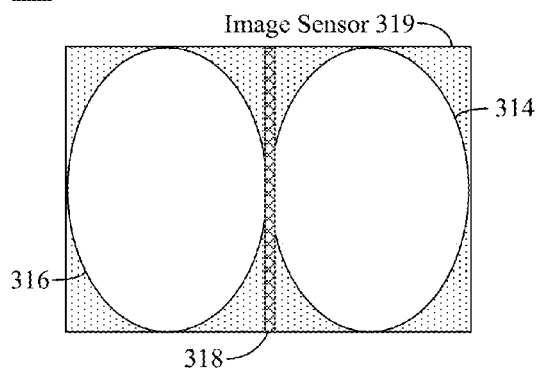
FIG. 3 is a schematic diagram illustrating a set of embodiments and a system 370 for isolating opposing lenses from each other for an assembly that produces concurrent non-overlapping image circles on a common image sensor in accordance with an embodiment of the inventive arrangements disclosed herein.
Figure 3:
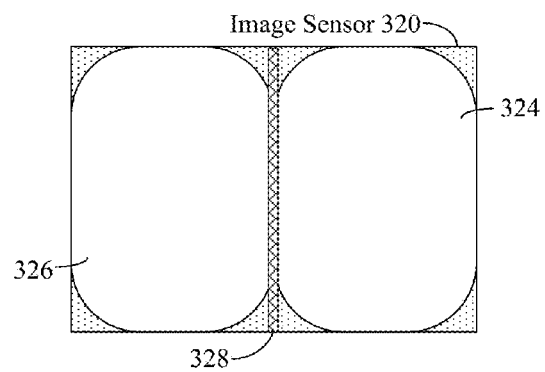
Figure 3:
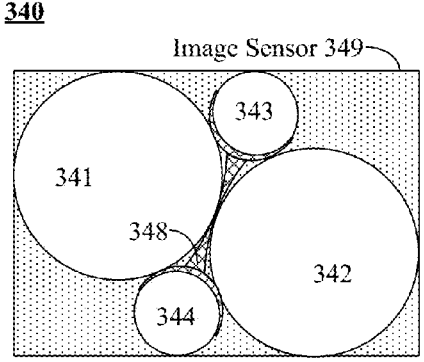
Figure 3:
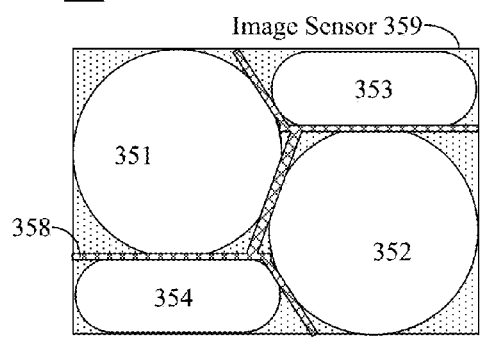
Figure 3:
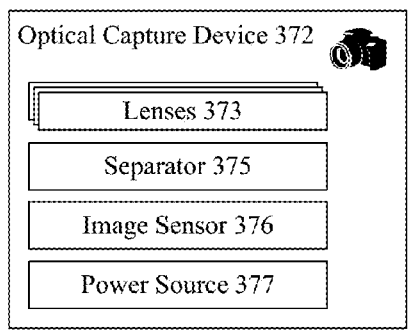

FIG. 3 is a schematic diagram illustrating a set of embodiments 310, 330, 340, 350 and a system 370 for isolating opposing lenses from each other for an assembly that produces concurrent non-overlapping image circles on a common image sensor in accordance with an embodiment of the inventive arrangements disclosed herein. Embodiments 210, 230 can be performed in the context of embodiments 150, 170, 210, and/or 250.

Embodiment 310, 330, 340, 350 illustrate exemplary arrangements for a non-reflective separator for reducing or eliminating peripheral light interference from adjacent non-overlapping concurrent image circles upon an image sensor.

Derivatives of the embodiments can be achieved with minor changes to the overarching design.

Embodiment 310 illustrates a simple separator 318 for image circles 314, 316 which conform to an ellipse or oval. For example, the separator 318 can be a rectangular solid perpendicular to the sensor 319. In one instance, separator 318 can be positioned along the middle of the width or length of the image sensor 319.

Embodiment 330 illustrates a simple separator 320 for image circles 324, 326 which conform to a rounded rectangle. For example, the separator 320 can be a rectangular square perpendicular to the sensor 320. In one instance, separator 328 can be positioned along the middle of the width or length of the image of the sensor 320.

Embodiment 340 illustrates a complex separator 348 for multiple image circles 341, 342, 343, 344 which vary in size and/or position within sensor 349. For example, the separator 348 can be a complex shape (e.g., tapered body with semi-circular ends) which can be positioned between the gaps of adjacent circles 341-344.

Embodiment 350 illustrates a complex separator 358 for multiple image circles 351, 352, 353, 354 which can very is size and/or position within sensor 359. For example, the separator 358 can be a complex shape (e.g., branched shape) which can be positioned between the gaps of adjacent circles 351-354.

System 370 can be an optical capture device able to maximize sensor 376 utilization by employing simultaneous non-overlapping image circles. System 370 can include additional components and is not limited to the exact arrangement disclosed herein.

Optical capture device 372 can be a hardware/software device with two or more lenses able to capture light from a surrounding real world environment and convey the light to an image sensor 353. In one instance, optical capture device 372 can be a 360 degree camera with two or more lenses (e.g., fish eye, wide angle, ultra wide angle). Device 372 can include characteristics such as aperture, focal length, depth of field, and the like. In one embodiment, device 372 can include a set of a fixed surround imaging components for capturing a field of view of between two hundred and seventy to three hundred and sixty degrees of a horizontal plane. For example, device 372 can include two diametrically opposing wide angle or ultra-wide angle lenses able to capture a field of view (FOV) of greater than 180 degrees. It should be appreciated that device 372 can include, but is not limited to, a pan capability, a tilt functionality, a zoom capability, and the like. In one embodiment, device 372 can include wired capabilities, wireless functionality, and the like. Device 372 can include, but is not limited to, lenses 373, optical waveguide 374, image sensor 356, power source 377, a processor, a bus, a non-volatile memory, a volatile memory, a data/power connector, a transceiver, and the like.

In one instance, device 372 can include software and/or firmware for processing sensor 376 image data, performing post processing functionality, and the like. In one instance, device 372 can perform image stitching, image interpolation, image correction, and the like. In one embodiment, device 372 can be communicatively linked with one or more computing devices which can permit communication of image data over a wired and/or wireless network.

In one embodiment, optical guides can be placed between the lenses to direct light to assure the arrangement of the optical circles as described herein is achieved in contemplated embodiments. In one embodiment, guides can be utilized to distort and/or deform image circles to achieve the distorted image circle shapes described herein.

In one instance, device 372 can include, but is not limited to, thermal imaging, infrared capabilities, low light functionality, and the like. In one embodiment, device 372 can include an array of lenses able to capture a high definition view of a real world environment. It should be appreciated that device 372 resolution can meet or exceed Standard Definition (SD), High Definition (HD), Quad HD/4K (QHD), and the like.

Lenses 373 can be a transmissive optical device that affects the focus of a light beam through refraction. Lenses 373 can include simple lenses, compound lenses, a lens array (e.g., lens stack), and the like. Lenses 373 can include, but is not limited to, biconvex, planoconvex, planoconcave, biconcave, positive meniscus, negative meniscus, and the like.

Separator 375 can be a physical element for absorbing light within camera 372. Separator 375 geometry can include, but is not limited to, a rectangle, a square, a trapezoid, and the like. It should be appreciated that separator 375 size (e.g., width, height, thickness) can conform to any arbitrary dimension. In one embodiment, separator 375 can be made of specialized materials such as VANTABLACK (e.g., "super" black material) with extremely high light absorption capabilities. In another embodiment, separator 375 can be covered in a light absorbing coating (e.g., light absorbing paint, light absorbing textures).

Image sensor 376 can be a hardware/software element for converting an optical image into an electronic signal. Sensor 376 semiconductor charge-coupled devices (CCD), active pixel sensors in complementary metal-oxide-semiconductor (CMOS), N-type metal-oxide-semiconductor (NMOS, Live MOS) technologies, and the like. Sensor size and/or resolution can conform to traditional and/or proprietary form factors and/or resolutions. For example, sensor 376 can be a ⅓.2" rectangular sensor with a height of 4.54 millimeters and a width of 3.39 millimeters.

Power source 377 can be a hardware/software electrical and/or electro-chemical entity able to provide electricity to device 372, device 372 components, and the like. Power source 377 can include, but is not limited to, a battery, an electrical power source, and the like.

Drawings presented herein are for illustrative purposes only and should not be construed to limit the invention in any regard. It should be appreciated that the disclosure can utilize the Lensmaker's equation to establish an initial or dynamic position for lenses 312, 314, sensor 320, and the like.

As used herein, an optical waveguide can be a spatially inhomogeneous structure for guiding light (e.g., for restricting the spatial region in which light can propagate). Waveguide can include a region of increased refractive index, compared with the surrounding medium. Waveguide can include, but is not limited to, planar waveguides guide (e.g., vertical direction guidance), channel waveguides guide (e.g., two dimensional guidance), and the like. For example, waveguide can be an optical fiber waveguide.

The flowchart and block diagrams in the FIGS. 1A-3 illustrate the architecture, functionality, and operation of possible implementations of systems, and/or methods according to various embodiments of the present invention. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The embodiment was chosen and described in order to best explain the principles of the invention and the practical application, and to enable others of ordinary skill in the art to understand the invention for various embodiments with various modifications as are suited to the particular use contemplated.

What is claimed is:

1. A digital optical device comprising:
a rectangular image sensor within an optical capture device; two lenses, comprising a first lens and a second lens, that capture and direct light from a real world environment upon the image sensor, wherein the image sensor is a device which converts the light from the real world environment into electronic signals, wherein light captured by the first lens is directed to a planar surface of the rectangular image sensor to produce a first image circle having a first image circle glow, wherein light captured by the second lens is directed to the planar surface of the rectangular image sensor to produce a second image circle having a second image circle glow, wherein on the planar surface the first image circle is non-overlapping with the second image circle, wherein the first image circle glow is a penumbral shadow as a result of optical scatter around the first image circle, wherein the second image circle glow is a penumbral shadow as a result of optical scatter around the second image circle, wherein as the first and second image circles are positioned on the planar surface in close proximity such that without controlling the optical scatter, the first image glow circle overlaps the second image circle and the second image glow circle overlaps the first image circle to produce a region of interference referred to as a damaged area where optical content of the first and second image circles experience scatter induced optical distortions; and
a non-reflective separator positioned between optical pathways of light from the two lenses, wherein the separator absorbs light representing the optical scatter to prevent the optical distortions that would otherwise appear within the first and second image circles.

2. The optical device of claim 1, wherein the rectangular image sensor is a square image sensor.

3. The optical device of claim 1, wherein each of the first and second image circles is an ellipse shape.

4. The optical device of claim 1, wherein each of the first and second image circles is a circular shape.

5. The optical device of claim 1, wherein the first lens faces in an opposite direction as the second lens faces.

6. The optical device of claim 1, wherein the separator is a non-reflective non-transparent separator configured to absorb light fall off from the optical pathways of light striking the image sensor, such that the separator does not absorb light directed to either the first or the second image circles but does absorb at least a portion of the optical scatter of the first image circle glow and the second image circle glow.

7. A camera module with multiple lenses comprising:
a rectangular image sensor within an optical capture device; and
two lenses within the optical capture device that capture and optically direct light upon a single surface of the rectangular image sensor of the optical capture device concurrently, wherein the light from the two lenses strikes the rectangular image sensor in non-overlapping areas simultaneously, wherein a first of the non-overlapping areas is referred to as a first image circle and wherein a second of the non-overlapping areas is referred to as a second image circle, wherein the image sensor is a device which converts light within the real world environment into electronic signals; and
a non-reflective non-transparent separator positioned between the optical pathways of light from the two lenses, wherein the separator absorbs optical scatter surrounding the first and second image circles to prevent optical distortions from scatter that would otherwise occur due to the first and second image circles being in close proximity to each other wherein a focal point of the first and second image circles lies within a diagonal line between opposing corners of the rectangular image sensor.

8. The method of claim 7, wherein the separator absorbs the light during an image capture functionality of the optical capture device.

9. The method of claim 7, wherein the rectangular image sensor of the optical capture device is a square image sensor.

10. The method of claim 7, wherein each of the first and second image circles is an ellipse shape.

11. The method of claim 7, wherein each of the first and second image circles is a circular shape.

12. The method of claim 7, the two lenses face in opposite directions as each other to capture light in opposite directions from each other.

13. The method of claim 7, wherein the separator is a non-reflective non-transparent separator configured to absorb light fall off from the optical pathways of light striking the image sensor, such that the separator does not absorb light directed to either the first or the second image circles but does absorb at least a portion of the optical scatter of the first image circle glow and the second image circle glow.

14. A system an optical capture device comprising:
a non-reflective separator positioned between optical pathways of light from two opposing lenses within a multi-lens camera, wherein light captured by a first of the two lenses is directed to a surface of a rectangular image sensor to produce a first image circle, wherein light captured by a second of the two lenses is directed to the surface of the rectangular image sensor to produce a second image circle, wherein the non-reflective separator absorbs peripheral light that is optical scatter outside of a light path striking the first or second image circle, wherein the non-reflective separator prevents optical distortions from the image circles which are in close proximity to each other such that without use of the non-reflective separator optical scatter outside the second image circle would overlap with the first image circle.

* * * * *